Aug. 15, 1950   J. J. ROURA, JR   2,519,153
TRIP MECHANISM FOR DUMP BODIES
Filed Aug. 10, 1948   2 Sheets-Sheet 1
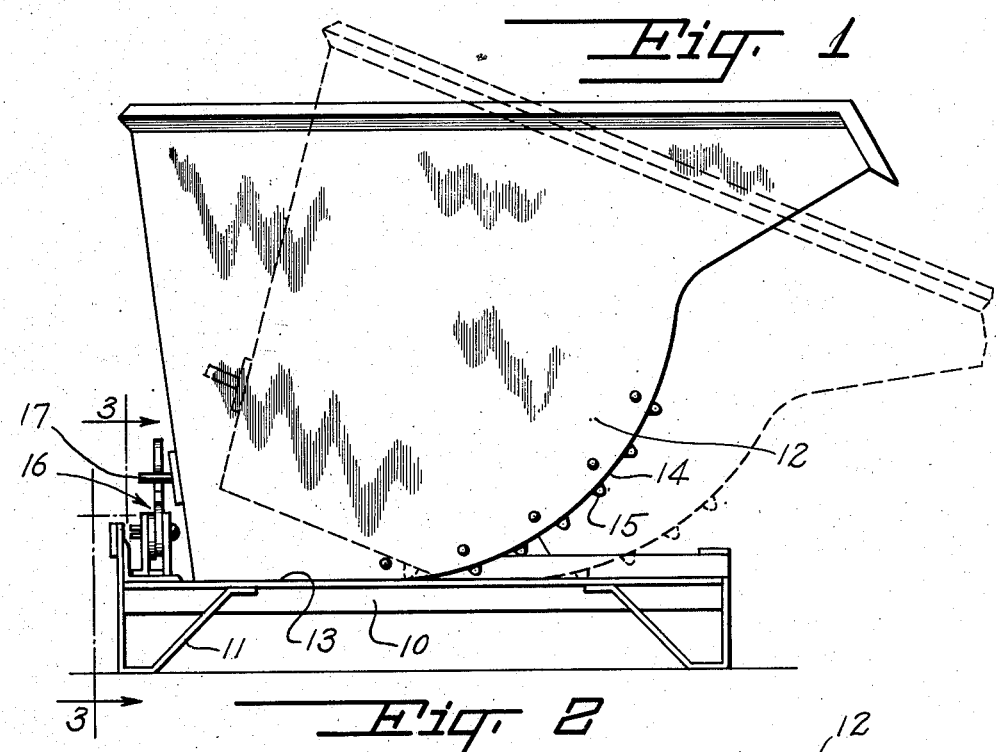
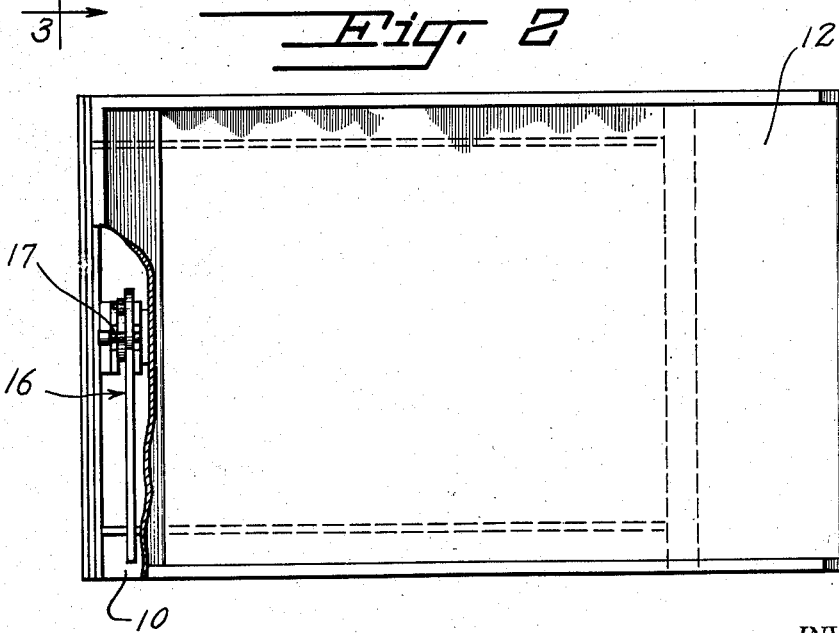
INVENTOR.
Joseph J. Roura Jr.
BY *Victor J. Evans & Co.*
ATTORNEYS Aug. 15, 1950   J. J. ROURA, JR   2,519,153
TRIP MECHANISM FOR DUMP BODIES
Filed Aug. 10, 1948   2 Sheets-Sheet 2
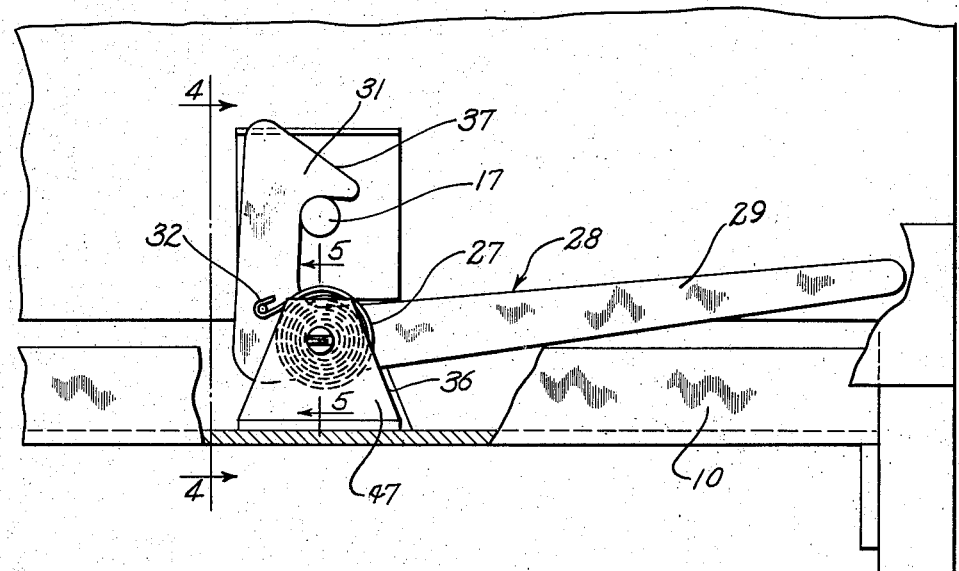
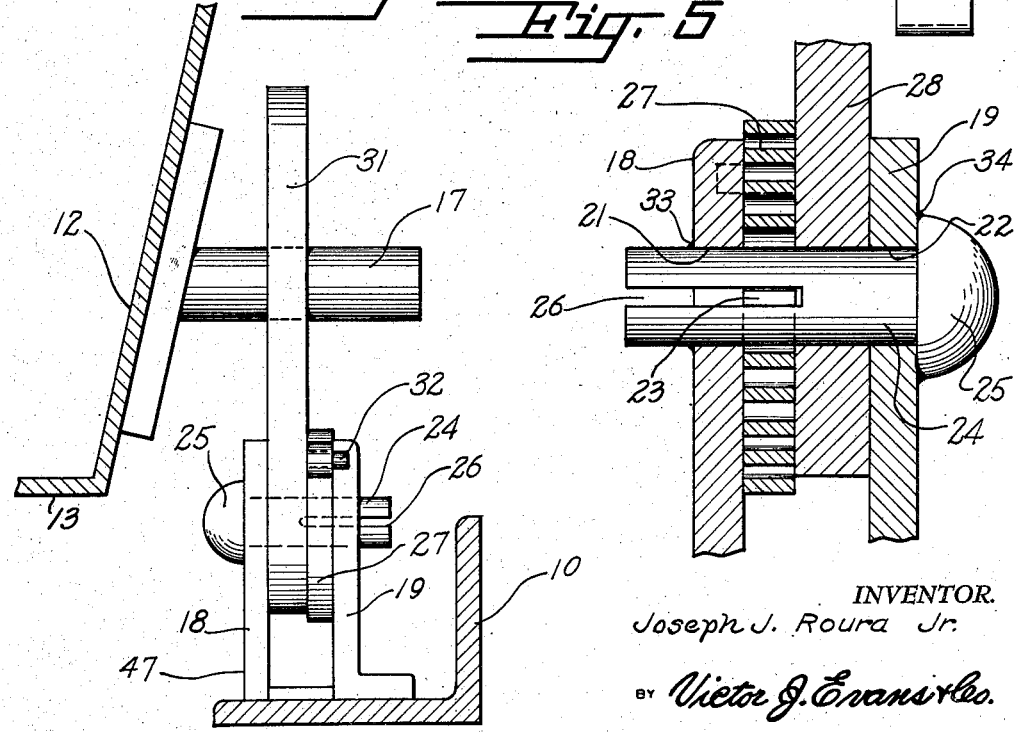
INVENTOR.
Joseph J. Roura Jr.
BY Victor J. Evans & Co.
ATTORNEYS Patented Aug. 15, 1950

2,519,153

UNITED STATES PATENT OFFICE 2,519,153

TRIP MECHANISM FOR DUMP BODIES

Joseph J. Roura, Jr., Detroit, Mich.

Application August 10, 1948, Serial No. 43,522

2 Claims. (Cl. 214—1.1)

This invention relates to dump bodies.

It is an object of the present invention to provide a dump body which is self-dumping and which will return to an upright position as soon as the materials have been dumped and wherein there is provided a trip lever which is automatically returnable to receive the dump body as it is returned and to retain it.

It is another object of the present invention to provide a trip lever which has a return spring which is mounted on the pivot pin and anchored to the pivot pin with the upright pivot bracket as by welding the pivot pin to the bracket, and wherein the pivot pin is slotted to receive the end of the spring and wherein the spring is guided and retained against lateral displacement of its coils by the side face of the pivot lever and the side face of the bracket.

Other objects of the present invention are to provide a dump body and a trip lever arrangement therefor which is of simple construction, inexpensive to manufacture, has minimum parts, easy to operate, and efficient and automatic in operation.

For other objects and for a better understanding of the invention, reference may be had to the following detailed description taken in connection with the accompanying drawing, in which Fig. 1 is a side elevational view of the dump body having a base adapted for connection with a lift truck and employing the trip lever arrangement of the present invention.

Fig. 2 is a top plan view of the dump body with portions broken away to show in plan the top of the trip lever.

Fig. 3 is an enlarged side elevational view of the trip lever, taken on line 3—3 of Fig. 1.

Figs. 4 and 5 are enlarged transverse sectional views taken through the dump body and the trip lever, said views being taken respectively on lines 4—4 and 5—5 of Fig. 3.

Referring now to the figures, 10 represents a platform having legs 11 in each of its four corners and having space therebetween through which the bottom of a lift truck may be extended as at times when it is desired to transport the base 10 with its dump body 12 thereon. The dump body 12 has a straight bottom portion 13 adapted to rest on the platform 10 when the dump body is retained in an upright position and a curved bottom portion 14 with projections 15 thereon engageable with openings in the platform 13 whereby to confine the dump body against lateral shifting movement as the dump body is tilted on its curved bottom surface 14. The flat or straight bottom portion 13 has less area than the curved bottom portion 14 and the dump body is normally biased to rotate to a dumping position. Suitable stops will limit the movement of the dump body 12 to dump its contents and automatically upon the contents being completely removed from the dump body, the dump body will be returned to rest on its flat bottom 13, the weight of the dump body being so distributed to effect this result.

When the dump body is filled with material it is normally retained against dumping movement by a trip lever arrangement 16 secured to the platform 10 and adapted to engage with a pin projection 17 on the dump body 12. This trip lever arrangement comprises a double bracket 47 welded to the platform and extending upwardly therefrom and having bracket portions 18 and 19 spaced from one another and having respectively openings 21 and 22 adapted to receive a pivot pin 24 having a rounded head 25 for engagement with the side face of one of the bracket portions and a longitudinally extending slot 26 extending along its shank inwardly a sufficient distance to receive and anchor the inner end of a concentric coil spring 27 as shown at 23. This spring 27 lies against the side of a trip lever 28 having a handle portion 29 and an upstanding hook portion 31 adapted to extend over the pin projection 17 on the dump body. The outer end of the spring 27 is bent and secured to a pin 32 projecting from the side of the upright portion 31. The lever 28 is pivoted on the pin 24 and the side of the same serves to support the coils of the spring against lateral displacement. The coils of the spring are supported on the opposite side thereof by the inner side face of the upstanding bracket portion 19.

With this construction, the spring 27 can be preloaded by turning the pin 24 and by welding the pin to the bracket portions as at 33 and 34.

In order to release the trip lever, the same is pulled upwardly by its handle to pivot rearwardly the hook portion 31. This upward movement will be against the action of the spring 27 and upon release of the lever 28 the spring will return the same to its original position and against a stop 36. The upper end of the upright portion 31 has an inclined face 37 which may be engaged by the pin 17 and which causes the lever to be moved upwardly under the weight of the dump body as it is returned and wherein the dump body will be automatically latched as soon as the pin 17 clears the end of the hook portion 31.

It will be apparent that the action of the dump body is automatic and its connection with the lever is effected automatically. The dump body, when relieved of its contents, will be returned to the platform so that its flat bottom portion 13 will engage the same under the weight of the dump body and the dump body will be so retained in this position by the lever arrangement 16.

While various changes may be made in the detail construction, it shall be understood that such changes shall be within the spirit and scope of the present invention as defined by the appended claims.

I claim:

1. A dump body arrangement comprising a platform, a dump body having a curved bottom portion adapted to pivot over the platform and a flat bottom portion on which the dump body may rest upon the platform, a projection extending from the dump body, a spring operated trip lever device fixed to the platform and engageable with the projection on the dump body to normally retain the same on its flat bottom portion, said lever device operable automatically on the return of the dump body to receive the projection and to retain the same and the dump body against pivotal movement, and said spring operated lever device having a bracket with spaced bracket portions, a lever extended between the spaced bracket portions, a concentric coil spring extended between the lever and one of the bracket portions, a pin serving as a pivot for the lever extending through the lever and the spring and secured to a bracket portion, and the inner end of said spring secured to said pin and the outer end of said spring secured to said lever.

2. A trip lever device for dump bodies comprising a bracket having separated bracket portions, a lever extended between the bracket portions, a pivot pin extending through the bracket portions and said lever, said pin having a large head and a longitudinally extending slot, a concentric coil spring surrounding the pin and having an inner end extended into the slot of said pin, the outer end of said spring being fixed to said lever, said lever having a hook portion adapted to engage with a projection of a dump body, the side of said lever serving to retain the concentric coil spring against lateral displacement and the side of one of the bracket portions similarly serving to retain the coils against lateral displacement in an opposite direction, and means for securing said pivot pin to one of the bracket portions.

JOSEPH J. ROURA, Jr.

REFERENCES CITED

The following references are of record in the file of this patent:

UNITED STATES PATENTS

| Number | Name | Date |
|---|---|---|
| 1,152,342 | Perkins | Aug. 31, 1915 |
| 1,212,368 | Lee | Jan. 16, 1917 |
| 2,422,283 | Anderson | June 17, 1947 |